Dec. 3, 1968  R. L. PAQUIN  3,413,820
SUPREME SERVICE ASSEMBLY
Filed Sept. 26, 1966  2 Sheets-Sheet 1

INVENTOR
ROGER L. PAQUIN
BY
Owen, Wickersham & Erickson
ATTORNEYS

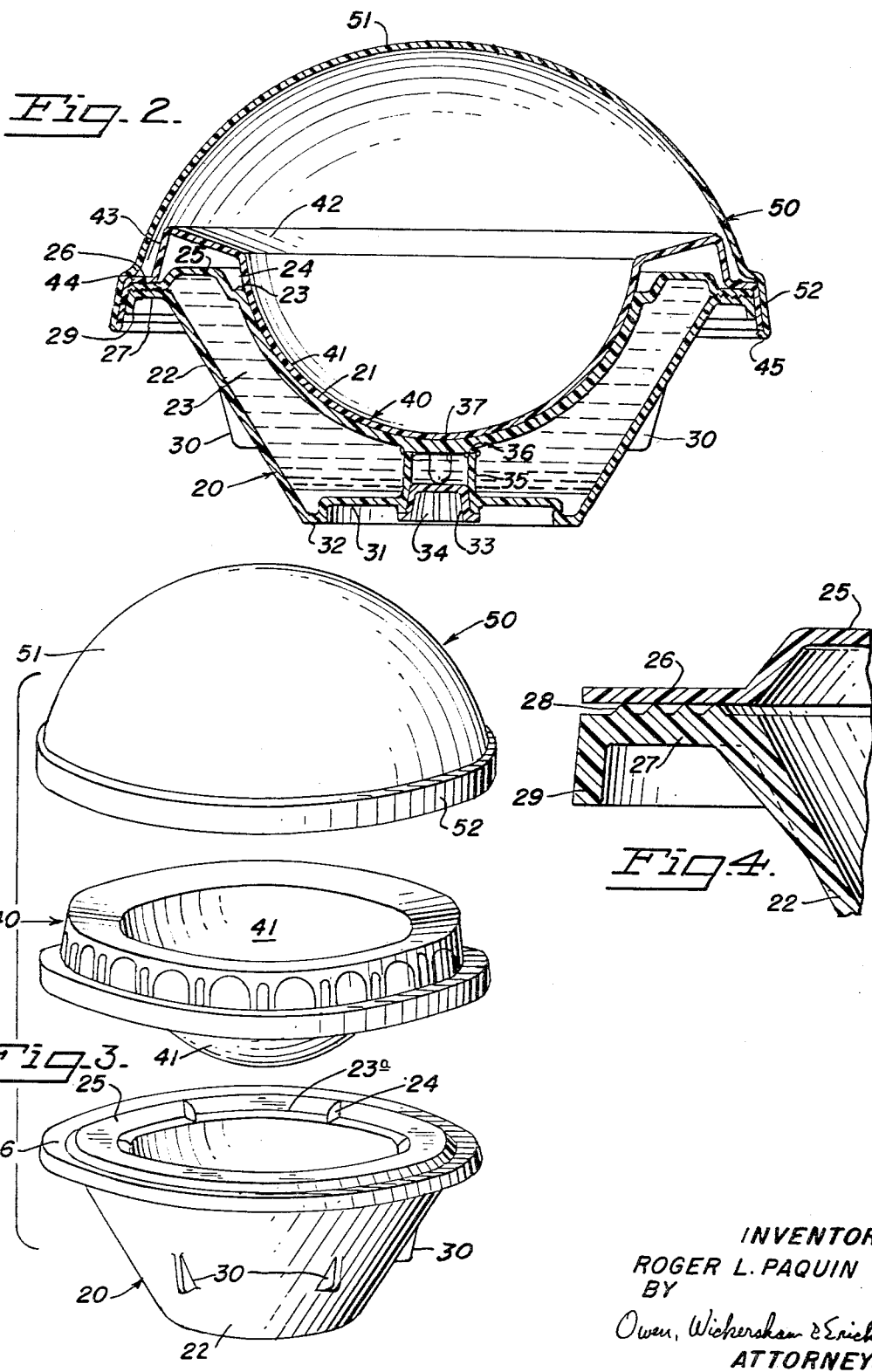

United States Patent Office 3,413,820
Patented Dec. 3, 1968

3,413,820
SUPREME SERVICE ASSEMBLY
Roger L. Paquin, Killingworth, Conn., assignor to Glacier Ware, Inc., a corporation of Connecticut
Filed Sept. 26, 1966, Ser. No. 582,130
4 Claims. (Cl. 62—371)

ABSTRACT OF THE DISCLOSURE

A double-walled cold capsule including a bottom wall portion, a frusto conical side wall portion integral therewith and an inner parti-spherical wall portion, the inner and side wall portions each having an upper edge and a radial lip extending therefrom with the lips secured to provide a sealed cavity, and a refrigerant solution sealed within the cavity, the side wall portion having a series of projections for nesting the capsule with others in spaced stacked relation.

---

This invention relates to a supreme service assembly.

By "supreme service assembly," we refer to the terminology used in the hotel and restaurant industry to denote the vessels in which cold consommes, fruit cocktails, shrimp and other seafood cocktails, some cold desserts, and several other foods are served. Basically, it comprises an outer bowl known in the trade as a "supreme dish" holding, conventionally, crushed ice. Another inner dish or bowl is placed so as to be surrounded by the crushed ice and holds the food being served. The purpose, of course, is to keep the food cold while it is being served and eaten.

In the conventional supreme service, the use of crushed ice has caused difficulties. Not only has it been messy, resulting in many spillages during handling, especially as the ice thaws, but also it has failed in many instances to keep the food dish cold enough for a sufficiently long time period. Furthermore, the use of ice has created handling problems and has meant that each supreme service dish had to be prepared just before being served to the diner; for if the dish were set up in advance, the ice would thaw and the service to the consumer would not be satisfactory.

In the present invention, the ice is replaced by a novel cold capsule—a double-walled container containing a liquid which has a freezing point below the freezing point of water and which is thoroughly frozen before use at a temperature lower than that of ice. This capsule is thus able to keep the inner dish and its food cool for a considerable length of time. The invention has many advantages: The use of ice is completely avoided, so that no ice need be handled by anyone. The capsule is standard in size and shape and is put into the outer supreme dish without any difficulties, for there is none of the customary difficulty in manipulating ice when trying to get the inner dish in. According to the present invention, the inner dish is made to fit precisely within the cold capsule, thereby giving improved contact with better cooling action.

An important feature of this invention is that the capsules can be inverted and stacked on each other and thereby frozen in a very compact arrangement. A rack may be used to support them, and they are kept from sticking to each other after freezing by a novel spacing structure provided on the capsules themselves. This spacing also helps later to keep the outer supreme dish itself from dissipating significant amounts of the cold; for the same reason, the outer supreme dish is warmer to the touch than heretofore, and, of course, less moisture from the atmosphere condenses on the outer surfaces of the supreme dish. This makes the service easier, as well as any manipulation by the eater.

The invention also contemplates a special removable liner in which the food is actually served. This may, due to the use of the capsule assembly, be made as a disposable unit, which can be used once and then thrown away, thereby eliminating dishwashing; however, where a more elegant type of service bowl is preferred, it may be made from metal, which then acts as a very good conductor and helps to keep the food cool.

In addition, the invention enables the use of a special transparent cover, which when used, makes it possible for the kitchen (as at a banquet) to put up a large number of supreme service units, so that they are all ready for the waiter to take in when the word is given. The transparent cover protects them from flies and contamination, and they may actually be put on the table, giving a very pleasing and elegant appearance, and yet, due to the use of the cold capsule of this invention, the food may be kept in that form for several hours, even when displayed, without becoming warm, and in fact just at the right temperature for eating.

Other objects and advantages of the invention will appear from the following description of some preferred forms thereof.

In the drawings:

FIG. 2 is an enlarged view in elevation and in section of the assembly with the outer main supreme bowl removed.

FIG. 3 is an exploded view in perspective of the assembly of FIG. 2.

FIG. 4 is a fragmentary detailed view in elevation and in section of a portion of the cold capsule, showing it at an early stage of its manufacture.

Figure 1:
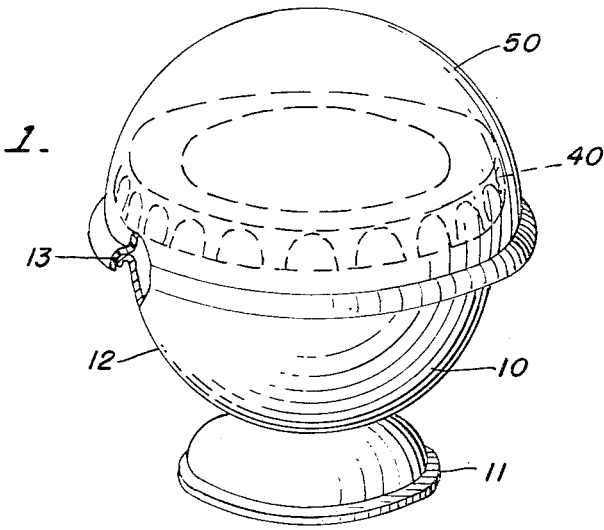
FIG. 1 is a view of a supreme service assembly embodying the principles of the present invention, with a portion broken away.
Figure 5:
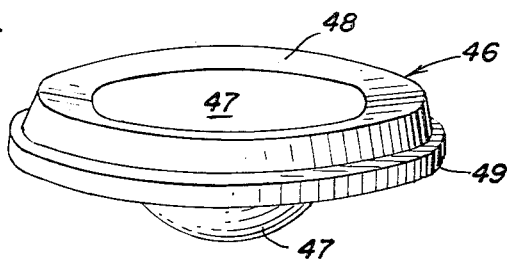
FIG. 5 is a view of a metal type of insert used to contain the food when the disposable one (shown in FIG. 3) is not desired.
Figure 6:
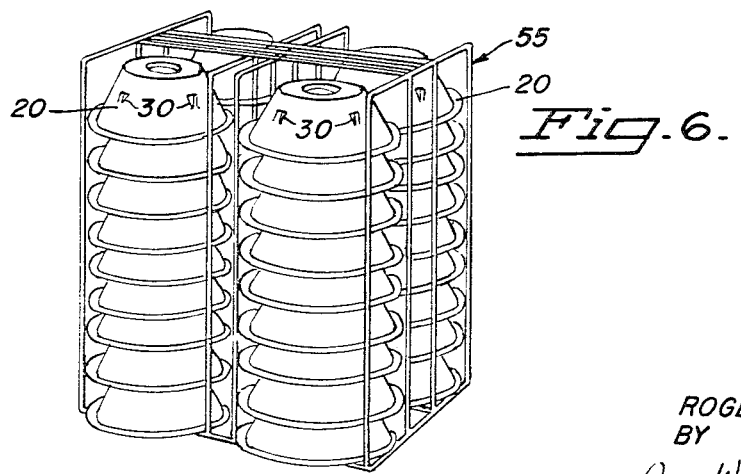
FIG. 6 is a view in perspective of a stack of capsules on a rack prepared for refrigeration.

A standard supreme dish 10 is used unchanged by this invention. It is a well-known standard article of commerce, and one of the features of the present invention is to enable the restaurant owner to retain the standard supreme dishes that he already has on hand, while increasing the convenience of supreme service. The dish 10 has a standard or base 11 and a bowl 12 with a lip 13.

One of the most important parts of the present invention is the cold energy capsule 20, which comprises an inner wall 21 and an outer wall 22 with a liquid refrigerant 23 in between them. This refrigerant 23 may be a mixture of water and glycerine, for example, filling approximately 90% of the space between the walls 21 and 22, so that expansion will not cause the breakage of the walls. The capsules 20 are preferably frozen upside down so that the frozen mass remains at the top and in contact with all the inner wall 21.

The inner wall 21 of the capsule 20 is preferably hemispherical in shape to receive a hemispherical liner 40. The wall 21 may have a stepped portion 23a at its upper end with a plurality of ribs 24 to keep contact with the projecting ribs, and at the same time to provide a positive driving means for assisting in the chucking of the inner part 21 while it is being spin-welded to the outer wall 22, and it has a flat upper portion 25 extending over and then stepped down to a rim 26. The outer wall 22 may be frusto conical in shape with an outer rim 27, which is spin-welded to the rim of the inner wall member. Before spin-welding, the upper surface of the rim 27 may have a serrated formation 28 (see FIG. 4), which provides the material for the weld, and the rim 27 has a depending lip 29. The outer wall 22 preferably has a series of radially outwardly extending ribs 30, which serve to space the capsules 20 apart when they are stacked for freezing, and therefore makes it easy to separate them from each other after the contents have been thoroughly frozen. These ribs 30 also serve to keep the stacked capsules separated slightly so that the cooling of the refrigerant is at maximum. If the capsules are stacked so that complete annular contact is made with the next capsule, cold air circulation is cut off by the presence of the adjacent capsule and the freezing time becomes greater.

The outer wall 22 goes down and becomes a part of a bottom wall 31, which is a flat portion preferably inset so that it lies above an outer bottom rim portion 32. There is a central opening 33, closed by a plug 34 and having an annular wall 35 extending upwardly into engagement with a flat bottom surface 36 of the hemispherical inner wall 21, thereby affording support. To enable free passage of the refrigerant liquid, notches 37 are formed in the cylindrical wall 35.

A disposable liner 40, shown in FIGS. 2 and 3, comprises a molded plastic member, which may be made from polystyrene, having a main hemispherical wall 41 in which the food is supported. At the top a portion 42 slopes upwardly and outwardly, and is connected by a vertical portion 43 to an outer rim 44 which overlies and engages the outer wall. This may be provided with a snap set lip 45 so that the members 20 and 40 may be snapped together and held tightly, or it may be a simple overlying fit.

In place of the plastic liner 40, a stainless steel or other metal liner 46 may be used. This member 46 may be shaped generally the same with a hemispherical inner wall 47, an upwardly and outwardly sloping wall 48, which in this instance is preferably curved rather than straight, and again an overlying rim portion 49 which fits over the outer rim 26 of the capsule 20.

A cover 50 may be used, preferably comprising a disposable member made of food-safe styrene, and it may be clear and transparent. It comprises a hemispherical dome 51 having an outer rim 52 which locks over the rim 44 (or 49) of the liner 40 (or 46).

Ice cream, shrimp cocktail, fruit cups, can all be prepared in quantity, left out at room temperature, and still be served properly chilled two hours later and without any mess of melting ice, by using the complete combination.

In operation, a rack 55 of capsules 20 is put in the freezer and at the desired time is available with the refrigerant 23 frozen. The rack 55 may be made from heavy-duty steel wire coated with vinyl, and the capsules 20 are spaced apart from each other by the projecting ribs 30. The capsules 20 may be washed in the regular manner before being put into the freezer. The cold dishes may be prepared in advance and extra room-service trips may be eliminated. Ice cream may be served even in hot summer sun and outdoor areas such as swimming pools and still remain without thawing for a considerable length of time.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A supreme service set for serving cold foods such as seafood and fruit cocktails, ice cream, cold fruit and the like, adapted to fit into a standard supreme bowl having a generally hemispherical shape, including in combination a double-walled cold capsule comprising an outer plastic wall having a bottom wall, a generally frustoconical side wall extending upwardly and outwardly therefrom, and a generally horizontal lip at the upper edge of said side wall, an inner plastic wall having a hemispheric bowl portion and a lip connected to the upper edge thereof by a laterally extending portion, said inner and outer walls being sealed together at said lip and said bowl portion being spaced from said side and bottom walls to enclose a sealed cavity, and a freezable liquid largely filling said cavity and serving, when frozen, to keep said capsule cold, said capsule being insertable in said supreme bowl with its sealed lips resting on the upper lip of the supreme bowl and otherwise spaced away therefrom, to retain the cold charge in said frozen liquid, and a service liner having a generally hemispherical thin wall fitting snugly in said bowl portions of said inner wall and having an upwardly and outwardly sloping portion with lip-engaging means on its outer edge to grasp and fit snugly and removably on the outer edge and upper portion of the lips of said capsule.

2. The service set of claim 1 having a transparent hemispherical cover member fitting snugly over said lip-engaging means of said liner and extending up in the opposite direction from said liner and said bowl portion, for protecting and displaying food served in said liner in the supreme service set.

3. The service set of claim 1 wherein said lip engaging means includes a generally vertical portion extending down from the sloping portion of said liner, a horizontal portion at the bottom of said generally vertical portion, engaging the lip of said inner wall, and a downwardly extending rim extending over the outermost edge of said capsule and in contact with it.

4. For use in serving cold comestibles, a double-walled capsule comprising an outer wall having a bottom wall portion and a frustoconical side wall portion integral therewith and extending upwardly and outwardly from the bottom wall portion, the side wall portion having an upper edge and a generally horizontal lip formed thereon, and an inner parti-spherical wall having an upper edge and a radial lip formed thereon and sealed upon the lip of the outer side wall portion, the parti-spherical wall being spaced from said side and bottom wall portions providing a sealed cavity, a refrigerant solution substantially filling the cavity, and a plurality of projections formed on the outer side wall portion for nesting the capsule with others in spaced stacked relation.

References Cited
UNITED STATES PATENTS

| | | | |
|---|---|---|---|
| 950,239 | 2/1910 | Oskamp | 62—457 |
| 2,187,387 | 1/1940 | Trigg et al. | 62—457 |
| 2,622,415 | 12/1952 | Landers et al. | 62—457 |
| 2,767,563 | 10/1956 | Picascia | 62—457 |
| 3,205,677 | 9/1965 | Stoner | 62—457 |
| 3,269,144 | 8/1966 | Poris | 62—457 |
| 3,302,428 | 2/1967 | Stoner et al. | 62—457 |

WILLIAM J. WYE, *Primary Examiner.*